United States Patent
Ahmad et al.

(10) Patent No.: US 11,148,785 B2
(45) Date of Patent: Oct. 19, 2021

(54) PARALLEL ACTUATION CONTROL SYSTEM PROVIDING DUAL MODE OPERATOR CONTROL INPUTS FOR A COMPOUND AIRCRAFT

(71) Applicant: The Boeing Company, Chicago, IL (US)

(72) Inventors: Jaheen Noor Ahmad, Gilbert, AZ (US); Bryan C. Chu, Phoenix, AZ (US); Russell Enns, Chandler, AZ (US); Gary D. Klein, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 272 days.

(21) Appl. No.: 16/548,118

(22) Filed: Aug. 22, 2019

(65) Prior Publication Data

US 2021/0061444 A1    Mar. 4, 2021

(51) Int. Cl.
| | |
|---|---|
| *B64C 13/46* | (2006.01) |
| *B64C 13/50* | (2006.01) |
| *B64C 27/68* | (2006.01) |
| *B64C 13/12* | (2006.01) |
| *B64C 27/26* | (2006.01) |
| *B64C 27/82* | (2006.01) |

(52) U.S. Cl.
CPC ............ *B64C 13/12* (2013.01); *B64C 13/503* (2013.01); *B64C 13/507* (2018.01); *B64C 27/26* (2013.01); *B64C 27/68* (2013.01); *B64C 2027/8236* (2013.01)

(58) Field of Classification Search
CPC .............................. B64C 13/507; B64C 27/68
See application file for complete search history.

(56) References Cited

U.S. PATENT DOCUMENTS

| | | | | |
|---|---|---|---|---|
| 2,630,284 A | * | 3/1953 | Feeney | B64C 13/507 244/228 |
| 4,513,235 A | * | 4/1985 | Acklam | B60K 26/021 318/685 |

(Continued)

OTHER PUBLICATIONS

Department of the Army Technical Manual; Preliminary Operator's Manual; Army Model AH-56A Compound Helicopter, (Mar. 15, 1969); pp. 1-630, Copy #5; Burbank California, USA.

(Continued)

*Primary Examiner* — Joseph W Sanderson
(74) *Attorney, Agent, or Firm* — Vivacqua Crane

(57) ABSTRACT

A flight control system having a plurality of dual mode operator control inputs is disclosed and includes a plurality of active parallel actuators, one or more processors, and memory coupled to the one or more processors. The memory stores data comprising a database and program code that, when executed by the one or more processors, causes the flight control system to receive a signal indicating an airspeed of the compound aircraft and select between rotary and fixed wing modes of operation based on the airspeed. In response to selecting a mode of operation, the flight control system sends either a rotary or a fixed wing force feel profile to the plurality of active parallel actuators, where the force feel profile defines the respective detent force gradient, where the fixed wing detent force gradient is at least about two times greater than a rotary wing detent force gradient.

20 Claims, 6 Drawing Sheets

(56) References Cited

U.S. PATENT DOCUMENTS

| | | | | |
|---|---|---|---|---|
| 4,516,063 A | * | 5/1985 | Kaye | B60K 26/021 |
| | | | | 318/685 |
| 6,254,037 B1 | * | 7/2001 | Fenny | B64C 13/345 |
| | | | | 244/223 |
| 7,285,932 B2 | * | 10/2007 | A'Harrah | B64C 13/10 |
| | | | | 318/638 |
| 7,438,259 B1 | | 10/2008 | Piasecki et al. | |
| 7,474,944 B2 | * | 1/2009 | Cartmell | B64C 13/503 |
| | | | | 701/3 |
| 7,644,893 B2 | * | 1/2010 | Boczar | B64C 13/044 |
| | | | | 244/235 |
| 9,381,998 B2 | | 7/2016 | Taylor | |
| 10,059,439 B2 | * | 8/2018 | Gillett | B64C 13/44 |
| 10,967,953 B2 | * | 4/2021 | Zierten | B64C 13/0421 |
| 2004/0078121 A1 | * | 4/2004 | Cartmell | B64C 13/507 |
| | | | | 701/3 |
| 2018/0251207 A1 | * | 9/2018 | Kim | G05D 1/0858 |

OTHER PUBLICATIONS

USAASTA Project No. 72-08, AD 771 914 "Attack Helicopter Evaluation AH-56A Cheyenne Compound Helicopter", John N. Johnson, et al Jun. 1972.

\* cited by examiner

PARALLEL ACTUATION CONTROL SYSTEM PROVIDING DUAL MODE OPERATOR CONTROL INPUTS FOR A COMPOUND AIRCRAFT

The present disclosure relates to a flight control system for a compound aircraft. More particularly, the present disclosure relates to a compound aircraft having dual mode operator control inputs for controlling both rotary wing and fixed wing flight control surfaces.

BACKGROUND

A compound aircraft includes features of both a fixed wing aircraft and a rotary wing aircraft. Specifically, a compound aircraft includes flight control surfaces for a rotary wing aircraft such as, for example, a main rotor. The compound aircraft also includes flight control surfaces of a fixed wing aircraft as well. For example, a fixed wing aircraft includes ailerons and flaps found on the wings of the compound aircraft.

A flight control system for a compound aircraft is commonly based on a fly-by-wire approach where there is no physical connection between the control inceptors and the flight control surfaces, rather than a mechanical flight control system, which physically links the pilot's control inceptors to the flight control surfaces. Fly-by-wire systems are selected over mechanical control systems, as mechanical control systems are technically complex to design, harder to modify once implemented since physical changes instead of software are required, and include limited capabilities. However, for mechanical flight control-based helicopter systems that are to be retrofitted to a compound aircraft, the cost to convert to a complete fly-by-wire system may be prohibitively expensive to implement.

Aspects of a mechanical flight control based helicopter system may be combined with fly-by-wire elements for fixed wing functionality for a compound aircraft. However, it is challenging to combine a fly-by-wire system with a mechanical control system for a compound aircraft having both fixed wing control and rotary wing control. Furthermore, it is especially challenging to combine a fly-by-wire system along with a mechanical control system when the pilot's control inceptors are used to control both systems. For example, when the compound aircraft travels at higher speeds, the control inceptors' movement for rotor controls are not adherent to the aircraft's fixed wing flight control surfaces. For instance, as the forward speed of the compound aircraft is increased, the forward thrust is transferred to the propeller rather than coming from the main rotor forward tilt angle controlled by a forward input to the control inceptor, such as a longitudinal cyclic. Due to this propeller forward thrust, there is less forward swashplate cyclic required to maintain the higher speed. However, a swashplate cyclic that is part of the rotary control is physically connected to the longitudinal cyclic stick in a mechanical control system. Therefore, the pilot needs to move the longitudinal cyclic in the aft direction when increasing speed. In other words, the rotary wing control requires the pilot to move the control inceptor in an opposite direction than what is typical for increasing the speed of an aircraft. Other aircraft that have had this same issue required the addition of a series actuator, which adds weight and complexity.

Since it is challenging to combine a fly-by-wire system along with a mechanical control system when the pilot's inceptors are used to control both systems, an alternative approach would include two different sets of control inceptors for the fixed wing control and the rotary wing control. However, this approach increases the weight of the compound aircraft, and having two different sets of control inceptors may become confusing and difficult for a pilot to operate.

SUMMARY

According to several aspects, a flight control system for a compound aircraft is disclosed. The flight control system has a plurality of operator control inputs and a plurality of active parallel actuators. Each active parallel actuator corresponds to one of the plurality of operator control inputs. The flight control system also includes one or more processors in electronic communication with the plurality of active parallel actuators and a memory coupled to the one or more processors. The memory stores data comprising a database and program code that, when executed by the one or more processors, causes the flight control system to receive a signal indicating an airspeed of the compound aircraft and select a mode of operation based on the airspeed. The mode of operation is selected from a rotary wing mode of operation and a fixed wing mode of operation. In response to selecting the rotary wing mode of operation, the flight control system sends a rotary wing force feel profile to the plurality of active parallel actuators, where the rotary wing force feel profile defines a rotary wing detent force gradient. In response to selecting the fixed wing mode of operation, the control system sends a fixed wing force feel profile to the plurality of active parallel actuators. The fixed wing force feel profile defines a fixed wing detent force gradient, and the fixed wing detent force gradient is at least about two times greater than the rotary wing detent force gradient.

In another aspect, a method of operating a compound aircraft in either a fixed wing mode of operation, a rotary wing mode of operation, or a transition mode of operation is disclosed. The method includes receiving, by a computer, a signal indicating an airspeed of the compound aircraft. The method further includes selecting, by the computer, a mode of operation based on the airspeed, where the mode of operation is selected from the rotary wing mode of operation and the fixed wing mode of operation. In response to selecting the rotary wing mode of operation, the method includes sending a rotary wing force feel profile to a plurality of active parallel actuators. The rotary wing force feel profile defines a rotary wing detent force gradient. In response to selecting the fixed wing mode of operation, the method includes sending a fixed wing force feel profile to the plurality of active parallel actuators. The fixed wing force feel profile defines a fixed wing detent force gradient, and the fixed wing detent force gradient is at least about two times greater than the rotary wing detent force gradient.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a flight control system for a compound aircraft. The disclosed flight control system employs both mechanical controls as well as fly-by-wire controls. The compound aircraft includes dual mode operator control inputs to control the direction and rate of travel of the compound aircraft. It is to be appreciated that only a single set of operator control inputs are used to control both rotary wing control actuators as well as fixed wing control surface actuators of the compound aircraft. In other words, the disclosed flight control system does not require separate operator control inputs for controlling the rotary wing actuators and the fixed wing control surface actuators.

The following description is merely exemplary in nature and is not intended to limit the present disclosure, application, or uses.

Figure 1A:
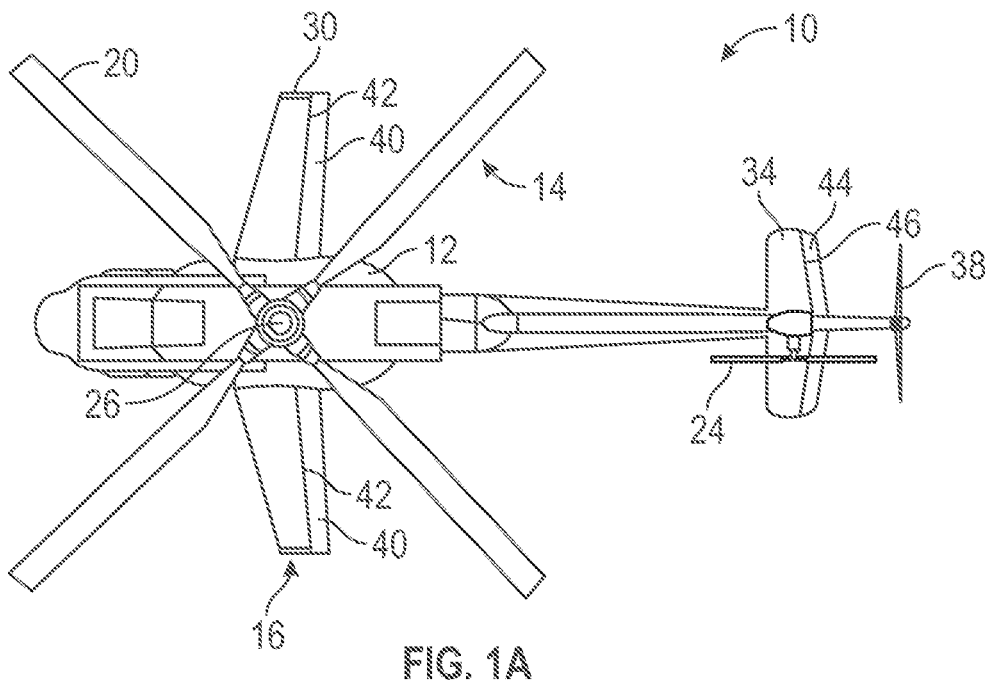
FIG. 1A is a top view of a compound aircraft having both rotary wing flight control surfaces and fixed wing aircraft control surfaces, according to an exemplary embodiment.
Figure 1B:
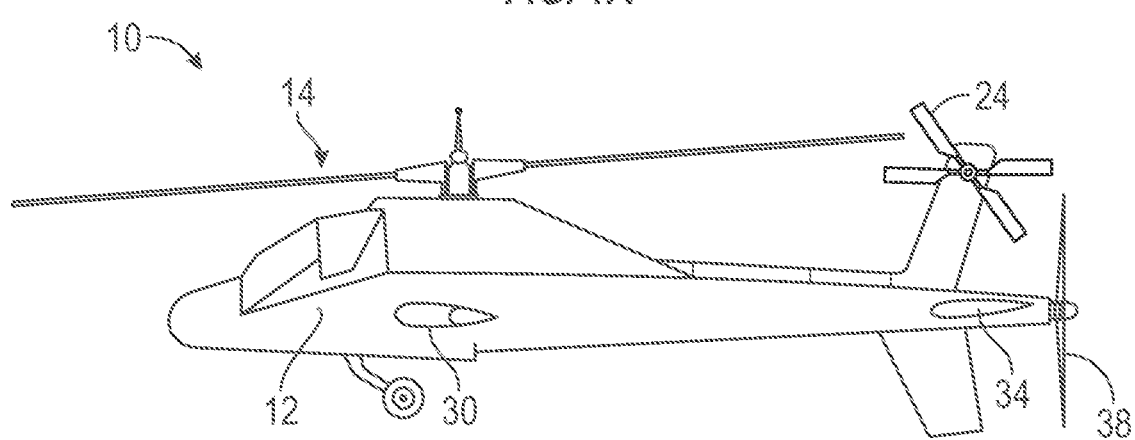
FIG. 1B is a side view of the compound aircraft shown in FIG. 1A, according to an exemplary embodiment.

Referring to FIGS. 1A and 1B, an exemplary compound aircraft 10 having a fuselage 12 is shown. FIG. 1A is a top view of the compound aircraft 10 and FIG. 1B is a side view of the compound aircraft 10. The compound aircraft 10 includes a plurality of rotary wing flight control surfaces 14 as well as a plurality of fixed wing flight control surfaces 16. In an embodiment, the plurality of rotary wing flight control surfaces 14 include, for example, a main rotor 20 and a tail rotor 24. The main rotor 20 rotates about a hub 26. The compound aircraft 10 further includes various features of a fixed wing aircraft such as, but not limited to, a pair of wings 30, a pair of horizontal stabilizers 34, and a propulsor 38. A flaperon 40 is disposed along a trailing edge 42 of each of the wings 30. An elevator 44 is also disposed along a trailing edge 46 of each of the horizontal stabilizers 34. The propulsor 38, the flaperons 40, and the elevators 44 are referred to as the plurality of fixed wing flight control surfaces 16. It is to be appreciated that FIGS. 1A and 1B are exemplary in nature, and the compound aircraft 10 may include other types of rotary wing flight control surfaces 14 and fixed wing flight control surfaces 16.

Figure 1C:
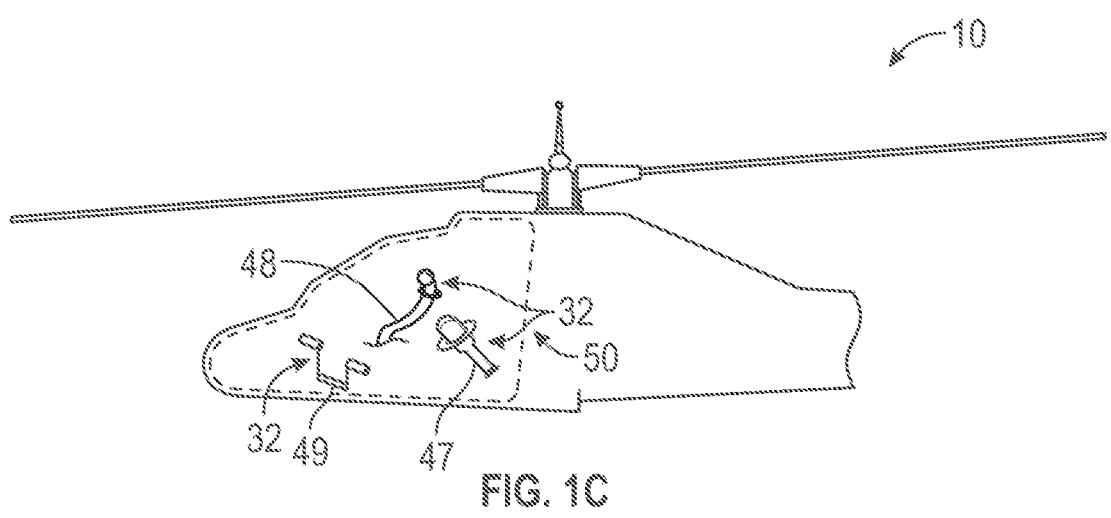
FIG. 1C illustrates a plurality of dual mode operator control inputs for the compound aircraft, according to an exemplary embodiment.

Referring to FIG. 1C, the compound aircraft 10 further includes a flight control system 50 having a plurality of dual mode operator control inputs, which are referred to as a plurality of operator control inputs 32. In the exemplary embodiment as shown in FIG. 1C, the operator control inputs 32 of the flight control system 50 include a thrust/collective lever 47, a longitudinal/lateral control stick 48, and directional pedals 49 that a pilot manipulates to control the directional heading of the compound aircraft 10. It is to be appreciated that the plurality of operator control inputs 32 are configured to control the plurality of rotary wing flight control surfaces 14 and the plurality of fixed wing flight control surfaces 16 of the compound aircraft 10. Accordingly, the compound aircraft 10 does not require separate operator control inputs 32 for controlling the rotary wing flight control surfaces 14 and the fixed wing flight control surfaces 16.

Figure 2:
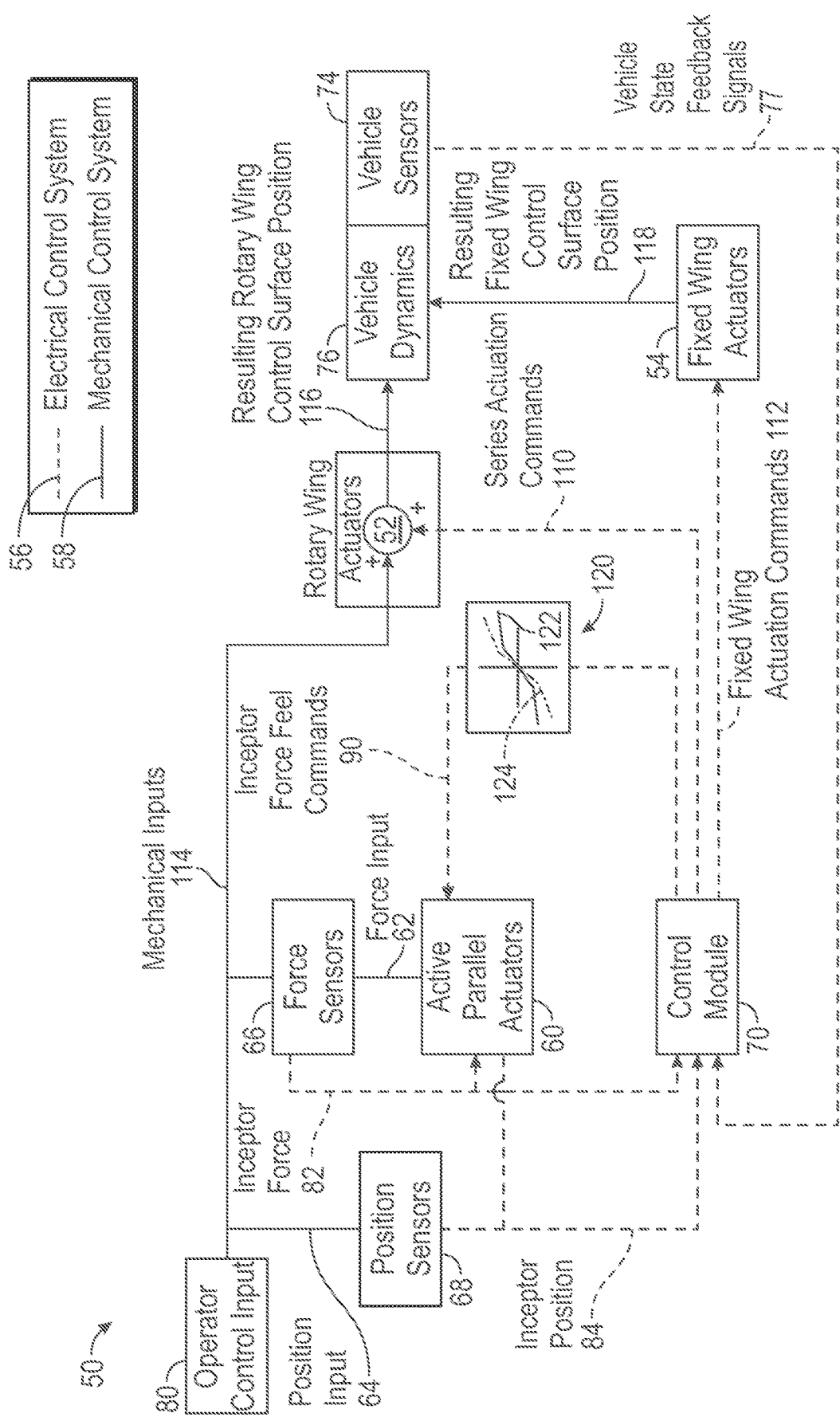
FIG. 2 is a schematic diagram of a flight control system for the compound aircraft including separate actuators for the rotary wing flight control surfaces and the fixed wing flight control surfaces, according to an exemplary embodiment.

FIG. 2 is a schematic diagram of the flight control system 50 of the compound aircraft 10. Referring to FIGS. 1A, 1B, and 2, the flight control system 50 is configured to control a plurality of rotary wing actuators 52 and a plurality of fixed wing actuators 54. The plurality of rotary wing actuators 52 are configured to actuate the rotary wing flight control surfaces 14, such as the main rotor 20 and the tail rotor 24 shown in FIG. 1A. Similarly, the plurality of fixed wing actuators 54 are configured to actuate the fixed wing flight control surfaces 16, such as the propulsor 38, the flaperons 40, and the elevators 44 shown in FIGS. 1A and 1B. The flight control system 50 combines an electrical control system 56 with a mechanical control system 58. FIG. 2 illustrates the electrical control system 56 in dashed lines and the mechanical control system 58 using solid lines.

The flight control system 50 further includes a plurality of active parallel actuators 60, one or more force sensors 66, one or more position sensors 68, a control module 70, and one or more vehicle sensors 74 for measuring states of vehicle dynamics 76. The control module 70 is in electronic communication with the plurality of rotary wing actuators, the plurality of fixed wing actuators 54, the plurality of active parallel actuators 60, the force sensors 66, the position sensors 68, and the vehicle sensors 74 measuring the vehicle dynamics 76. The plurality of active parallel actuators 60 align with the plurality of operator control inputs 32 shown in FIG. 1C (i.e., the thrust/collective lever 47, the longitudinal/lateral control stick 48, and the directional pedals 49). In other words, each active parallel actuator 60 corresponds to one of the operator control inputs 32. The plurality of active parallel actuators 60 are configured to provide tactile information to an operator via force feedback through the mechanical connection between each of the plurality of active parallel actuators 60 and their corresponding actuators.

The plurality of active parallel actuators 60 are configured to receive an operator control input 80. The operator control input 80 may represent a manual input from an operator, such as a pilot, or an automatic input generated by the control module 70. The operator control input 80 includes a force input 62 that is received by the force sensors 66 and a position input 64 that is received by the position sensors 68. The force input 62 indicates a quantity of force that is exerted upon the plurality of active parallel actuators 60. For example, the force input 62 represents the quantity of force required by a pilot to move the thrust/collective lever 47, the longitudinal/lateral control stick 48, or the directional pedals 49. The force input 62 is proportional to the displacement created when the operator moves the plurality of active parallel actuators 60 from its corresponding zero-force detent position 100 (shown in FIG. 3). The zero-force detent position 100 represents a position that the plurality of active parallel actuators 60 rests in when no external forces are applied. The position input 64 indicates an absolute position of the plurality of operator control inputs 32.

The force input 62 is communicated as an inceptor force 82 to the control module 70. In other words, the inceptor force 82 represents a quantity of force that is exerted upon the plurality of active parallel actuators 60. Similarly, the position input 64 is communicated as an inceptor position 84 to the control module 70, where the inceptor position represents an absolute position of the plurality of operator control inputs 32. In addition to the inceptor force 82 and the inceptor position 84, the control module 70 also receives information related to the vehicle dynamics 76 as well as information such as, but not limited to, gyroscopic position, velocity, altitude, and bank angle from a plurality of vehicle sensors 74. In an example, the vehicle dynamics 76 include movement characteristics such as, but not limited to, flight trajectory and path.

Figure 3:
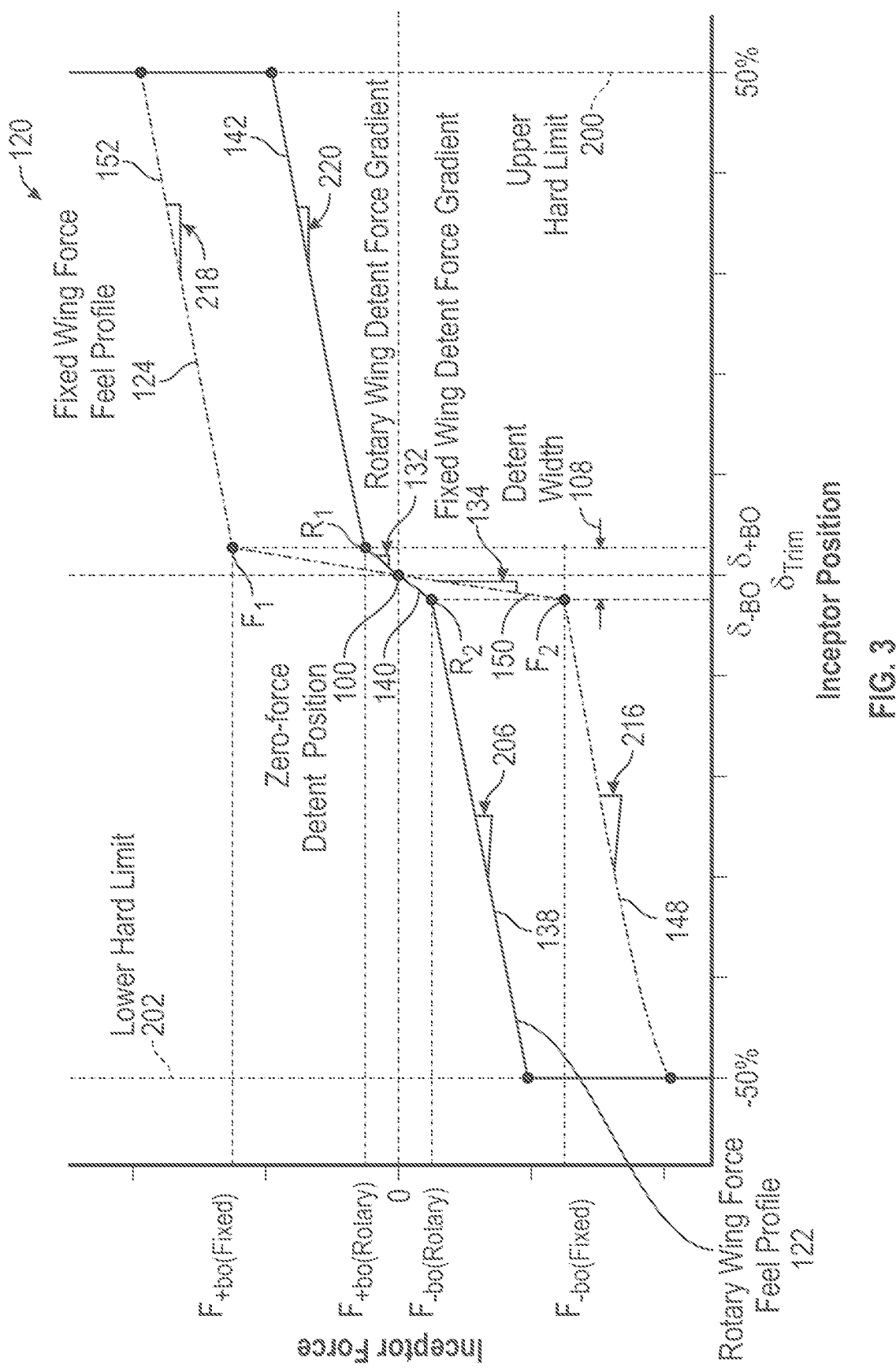
FIG. 3 is a graph illustrating a rotary wing force feel profile and a separate fixed wing force feel profile, according to an exemplary embodiment.

The control module 70 determines a plurality of inceptor force feel commands 90 that are sent to the plurality of active parallel actuators 60. Accordingly, the plurality of operator control inputs 32 (FIG. 1C) are affected by the inceptor force feel commands 90 as a countering force applied to the pilot input. The inceptor force feel commands 90 are determined by either a rotary wing force feel profile 122 or a fixed wing force feel profile 124, depending upon the mode of operation. In other words, the control module 70 provides the rotary wing force feel profile 122 or the fixed wing force feel profile 124, to the plurality of operator control inputs 32 based on the mode of operation. FIG. 3 is an enlarged view of a graph 120 including both the force feel profiles 122, 124. As seen in FIG. 3, both force feel profiles 122, 124 indicate the zero-force detent position 100. The rotary wing force feel profile 122 defines a rotary wing detent force gradient 132, and the fixed wing force feel profile 124 defines a fixed wing detent force gradient 134. As explained below, the control module 70 is configured to dynamically adjust a value of the zero-force detent position 100.

Referring back to FIG. 2, the control module 70 determines a plurality of series actuation commands 110, which are electrically-based signals sent to the plurality of rotary wing actuators 52. The rotary wing actuators 52 further receive a plurality of mechanical inputs 114. The plurality of mechanical inputs 114 are created as an operator manipulates the plurality of operator control inputs 32 (seen in FIG. 1C). The plurality of mechanical inputs 114 are measured as the inceptor position 84 components of the operator control input 80. The plurality of series actuation commands 110 refer to an electrical command that is in series with a mechanical command (i.e., the plurality of mechanical inputs 114), where series actuation provides partial control authority to the rotary wing actuators 52. Thus, the resulting rotary wing control surface position 116 of the rotary wing actuators 52 includes components of both the plurality of series actuation commands 110 from the control module 70 as well as the plurality of mechanical inputs 114.

The plurality of series actuation commands 110 represent a stability and command augmentation system (SCAS) input. A SCAS input represents short-term attitude or attitude rate stabilization as an operator manually manipulates an aircraft. Specifically, a SCAS input is configured to stabilize a rotary aircraft against outside disturbances as well as augment operator cyclic control input. The control module 70 determines the plurality of series actuation commands 110 by subtracting the zero-force detent position 100 from the inceptor position 84 to determine a state command. The plurality of series actuation commands 110 are then determined by comparing the state command with the plurality of feedback signals 77 generated by the vehicle sensors 74 based on rotary wing SCAS control laws. Some examples of rotary wing SCAS control laws include, but are not limited to, integral control, derivative control, feedforward control, sliding mode control, H-infinity control, and neural network based control. The plurality of series actuation commands 110 are configured to augment the plurality of mechanical inputs 114, and are based on the inceptor position 84 components of the operator control input 80 and the plurality of vehicle state feedback signals 77 generated by the plurality of vehicle sensors 74. In an embodiment, the amount of augmentation is about ten percent or less of the full range of the plurality of mechanical inputs 114.

In contrast, the only input to the fixed wing actuators 54 is a plurality of fixed wing actuation commands 112 determined by the control module 70. Thus, the resulting fixed wing control surface position 118 of the fixed wing actuators 54 is based on only the plurality of fixed wing actuation commands 112. The plurality of fixed wing actuation commands 112 are determined by setting the inceptor force 82 as the state command. The fixed wing actuation commands 112 are then determined by comparing the state command to the plurality of vehicle state feedback signals 77 generated by the vehicle sensors 74 based on fixed wing fly-by-wire control laws. Some examples of fly-by-wire control laws include, but are not limited to, integral control, derivative control, feedforward control, sliding mode control, H-infinity control, and neural network based control. Referring specifically to FIG. 2, the resulting fixed wing control surface position 118 of the fixed wing actuators 54 are based on the plurality of fixed wing actuation commands 112. It is to be appreciated that the fixed wing actuators 54 are based on fly-by-wire control. That is, the fixed wing actuators 54 only receive electrical signals, while both mechanical and electrical signals are sent to the rotary wing actuators 52.

FIG. 3 illustrates the graph 120 of an exemplary rotary wing force feel profile 122 and the fixed wing force feel profile 124. Referring to both FIGS. 2 and 3, the x-axis of the graph represents the inceptor position 84 and the y-axis of the graph 120 represents the inceptor force 82. The rotary wing force feel profile 122 and the fixed wing force feel profile 124 both include respective zero-force detent positions 100. It is to be appreciated that the zero-force detent position 100 is adjusted during operation of the compound aircraft 10, which is explained below.

The x-axis of the graph 120 indicates a positive breakout position $\delta_{+bo}$, a negative breakout position $\delta_{-bo}$, and a trim position $\delta_{trim}$. The trim position $\delta_{trim}$ represents the x-axis value of the zero-force detent position 100. The x-axis of the graph 120 further includes an upper hard limit 200 and a lower hard limit 202. The upper hard limit 200 represents a maximum displacement of the operator control inputs (FIG. 1C) and the plurality of active parallel actuators 60 in a positive direction, and the lower hard limit 202 represents a maximum displacement of the plurality of operator control inputs 32 and the plurality of active parallel actuators 60 in a negative direction. An operator is unable to move the plurality of active parallel actuators 60 past the upper hard limit 200 or the lower hard limit 202. Referring to both FIGS. 2 and 3, the control module 70 determines the zero-force detent position 100, which is a component of the inceptor force feel commands 90. The x-position of the zero-force detent position 100 also defines the trim position $\delta_{trim}$.

The y-axis of the graph 120 indicates a positive fixed wing breakout force $F_{+bo(fixed)}$ that corresponds to the positive breakout position $\delta_{+bo}$. The y-axis of the graph 120 also indicates a negative fixed wing breakout force $F_{-bo(fixed)}$ that corresponds to the negative breakout position $\delta_{-bo}$. The y-axis of the graph 120 further indicates a positive rotary wing breakout force $F_{+bo(rotary)}$ that corresponds to the positive breakout position $\delta_{+bo}$. Finally, the y-axis of the graph 120 also includes a negative rotary wing breakout force $F_{-bo(rotary)}$ that corresponds to the negative breakout position $\delta_{-bo}$.

The graph 120 further includes a detent width 108 measured along the x-axis. The detent width 108 represents an amount of movement that the plurality of operator control inputs 32 (FIG. 1C) undergo before exceeding either the positive breakout position $\delta_{+bo}$ or the negative breakout position $\delta_{-bo}$. In the non-limiting embodiment as shown in FIG. 3, the detent width 108 is the same for both the rotary wing force feel profile 122 as well as the fixed wing force feel profile 124, however, it is to be appreciated that in another approach the detent width 108 differs between the two force feel profiles 122, 124. It is to be appreciated that once the active parallel actuator 60 is moved away from the zero-force detent position 100 in either a positive or negative direction past the positive breakout position $\delta_{+bo}$, the force required to move the active parallel actuator 60 back to the zero-force detent position 100 decreases proportionally.

The rotary wing force feel profile 122 includes two points that are illustrated as positive breakout point R1 and negative breakout point R2. The positive breakout point R1 defines a positive value that corresponds to the positive breakout position $\delta_{+bo}$ and the positive rotary wing breakout force $F_{+bo(rotary)}$, and the negative breakout point R2 defines a negative value that corresponds to the negative breakout position $\delta_{-bo}$ and the negative rotary wing breakout force $F_{-bo(rotary)}$. Similarly, the fixed wing force feel profile 124 includes two points that are illustrated as positive breakout point F1 and negative breakout point F2. The positive breakout point F1 defines a positive value that corresponds to the positive breakout position $\delta_{+bo}$ and the positive fixed wing breakout force $F_{+bo(fixed)}$, and the negative breakout point F2 defines a negative value that corresponds to the negative breakout position $\delta_{-bo}$ and the negative fixed wing breakout force $F_{+bo(fixed)}$.

Referring to FIGS. 2 and 3, both the rotary wing force feel profile 122 and the fixed wing force feel profile 124 are represented by respective piecewise linear functions that are continuous and are unbroken lines. The rotary wing force feel profile 122 and the fixed wing force feel profile 124 each comprise of three line segments. It is to be appreciated that while FIG. 2 illustrates the rotary wing force feel profile 122 and the fixed wing force feel profile 124 as linear functions, in another embodiment the force feel profiles 122, 124 are not linear. However, both force feel profiles 122, 124 are always continuous functions. The rotary wing force feel profile 122 includes line segments 138, 140, 142. The line segment 138 connects the lower hard limit 202 to the negative breakout point R2, the line segment 140 connects the negative breakout point R2 to the positive breakout point R1, and the line segment 142 connects the positive breakout point R1 to the upper hard limit 200 of the rotary wing force feel profile 122 together.

The rotary wing force feel profile 122 is comprised of three unique line segments 138, 140, and 142 that each indicate a force gradient slope. Specifically, the line segment 138 is defined by a positive force gradient 206, and the line segment 142 is defined by a positive force gradient 220 of the rotary wing force feel profile 122. The line segment 140 defines the rotary wing detent force gradient 132. The positive force gradient 206, the rotary wing detent force gradient 132, and the positive force gradient 210 of the rotary wing force feel profile 122 represent a relationship between the inceptor position 84 and the inceptor force 82 provided by the operator control input 80. The rotary wing detent force gradient 132 represents a relationship between the inceptor position 84 and the inceptor force 82 provided by the operator control input 80 required to move the plurality of operator control inputs 32 (FIG. 1C) in a position that falls inside of the detent width 108 when the compound aircraft 10 is operating in a rotary wing mode of operation, which is described below.

Similarly, the fixed wing force feel profile 124 is comprised of three unique line segments 148, 150, 152. The line segment 148 connects the lower hard limit 202 to the negative breakout point F2, the line segment 150 connects the negative breakout point F2 to the positive breakout point F1, and the line segment 152 connects the positive breakout point F1 to the upper hard limit 200 of the fixed wing force feel profile 124 together. The line segment 148 is defined by a positive force gradient 216, and the line segment 152 is defined by a positive force gradient 218 of the fixed wing force feel profile 124. The line segment 150 is defined by the fixed wing detent force gradient 134.

The positive force gradient 216, the fixed wing detent force gradient 134, and the positive force gradient 218 of the fixed wing force feel profile 124 represent a relationship between the inceptor position 84 and the inceptor force 82 provided by the operator control input 80. The fixed wing detent force gradient 134 represents a relationship between the inceptor position 84 and the inceptor force 82 provided by the operator control input 80 required to move the plurality of operator control inputs 32 (FIG. 1C) in a position that falls inside of the detent width 108 when the compound aircraft 10 is operating in a fixed wing mode of operation, which is described below.

Referring specifically to FIG. 3, the fixed wing detent force gradient 134 (i.e., the slope of the line segment 150) is at least about two times greater than the rotary wing force feel gradient 132 (i.e., the slope of the line segment 140). In one specific embodiment, the fixed wing detent force gradient 134 is at least about two times but no more than about five times steeper than the rotary wing force feel gradient 132. Accordingly, it follows that an operator is required to exert at least about two and no more than about five times as much force upon the plurality of operator control inputs 32 (FIG. 1C) when the compound aircraft 10 is operating in a fixed wing mode of operation when compared to a rotary wing mode of operation to result in the same amount of movement from the zero-force detent position 100. In other words, the operator control inputs are at least about two and no more than about five times stiffer when the compound aircraft 10 operates in the fixed wing mode of operation versus the rotary wing mode of operation.

Although the fixed wing detent force gradient 134 is described as being at least about two times steeper than the rotary wing detent force gradient 132, it is to be appreciated that values of the two force gradients 132 and 134 vary based on the configuration of the compound aircraft 10 and operating parameters. Specifically, values for the fixed wing detent force gradient 134 and the rotary wing detent force gradient 132 are determined based on empirical data such as, but not limited to, evaluation feedback collected during testing and simulation. The primary variable affecting the rotary wing detent force gradient 132 and the fixed wing detent force gradient 134 is a sensitivity of a response of the compound aircraft 10 to the operator control inputs 80 (FIG. 2), which include pitch rate, roll rate, and yaw rate. Some other variables that also affect the rotary wing detent force gradient 132 and the fixed wing detent force gradient 134 include response characteristics of the compound aircraft 10

(other than pitch, roll, and yaw). In addition to the response of the compound aircraft 10, another variable that affects the rotary wing detent force gradient 132 includes an amount of movement of the rotary wing actuators 52 required to result in an acceptable amount of drag and the load limit margin.

Referring generally to FIGS. 2 and 3, the rotary wing force feel profile 122 and the fixed wing force feel profile 124 are two distinct profiles that each provide unique technical effects to the plurality of operator control inputs 32 (FIG. 1C). Specifically, the rotary wing detent force gradient 132 of the rotary wing force feel profile 122 is at least about two times less stiff than the fixed wing detent force gradient 134 of the fixed wing force feel profile 124. As a result, the plurality of active parallel actuators 60 experience a greater amount of displacement from the zero-force detent position 100 when the flight control system 50 is operating in the rotary wing mode when compared to the fixed wing mode of operation. Thus, the inceptor position 84 defines the operator control input 80 during the rotary wing mode of operation. In contrast, the plurality of active parallel actuators 60 experience a greater amount of force when the flight control system 50 operates in the fixed wing mode of operation. Accordingly, the inceptor force 82 defines the operator control input 80 during the fixed wing mode of operation.

Referring generally to FIGS. 1A, 1B, 2, and 3, the rotary wing mode of operation represents a mode of operation that employs only the rotary wing flight control surfaces 14 to maneuver and stabilize the compound aircraft 10, while the fixed wing flight control surfaces 16 are held at respective minimum drag positions. Similarly, the fixed wing mode of operation represents a mode of operation that employs only the fixed wing flight control surfaces 16 to maneuver and stabilize the compound aircraft 10, while the rotary wing flight control surfaces 14 are commanded to their respective minimum drag positions based on the zero-force detent position 100 and the plurality of series actuator commands 110. The compound aircraft 10 also includes a transition mode of operation that employs both the rotary wing flight control surfaces 14 and the fixed wing flight control surfaces 16 to maneuver and stabilize the compound aircraft 10.

The compound aircraft 10 operates in the rotary wing mode of operation at relatively lower airspeeds. Specifically, the control module 70 receives a signal indicating an airspeed of the compound aircraft 10 and selects the rotary wing mode of operation in response to determining the airspeed of the compound aircraft is less than a minimum fixed wing airspeed. The minimum fixed wing airspeed represents an airspeed under which the fixed wing flight control surfaces 16 (FIGS. 1A and 1B) do not generate a threshold amount of control moments upon the compound aircraft 10. In an embodiment, the threshold amount of control moments is at most about five percent of the control moments generated by the rotary wing flight control surfaces 14.

Referring to FIGS. 1A, 1B, and 2, when the compound aircraft 10 operates in the rotary wing mode of operation, the control module 70 employs rotary wing control laws to maneuver and stabilize the compound aircraft 10. Specifically, when the compound aircraft 10 operates in the rotary wing mode of operation, the control module 70 calculates respective minimum drag positions for the fixed wing flight control surface 16. The control module 70 then calculates specific values for the plurality of fixed wing actuation commands 112 that result in the fixed wing flight control surfaces 16 being placed in their respective minimum drag positions. In contrast to the fixed wing flight control surfaces 16, the rotary wing flight control surfaces 14 are controlled by the plurality of mechanical inputs 114 generated by an operator and the plurality of series actuation commands 110. The series actuation commands 110 are determined based on the rotary wing control laws saved in a memory of the control module 70 and are configured to augment the plurality of mechanical inputs 114 generated by the operator.

When the compound aircraft 10 operates in the fixed wing mode of operation, the control module 70 employs fixed wing control laws to operate the compound aircraft 10. Fixed wing control laws control the fixed wing flight control surfaces 16 to maneuver and stabilize the compound aircraft 10. Additionally, fixed wing control laws also retain the rotary wing flight control surfaces 14 in their respective minimum drag positions. Specifically, the control module 70 determines respective minimum drag positions for each of the rotary wing flight control surfaces 14. The control module 70 then calculates specific values for the zero-force detent position 100 and the series actuation commands 110 that result in the rotary wing flight control surfaces 14 being placed in their respective minimum drag positions.

The compound aircraft 10 operates in the fixed wing mode of operation at relatively higher airspeeds. Specifically, the control module 70 selects the fixed wing mode of operation in response to determining the airspeed of the compound aircraft 10 is greater than a maximum rotary wing airspeed. The maximum rotary wing airspeed represents the airspeed at which the fixed wing mode of operation results in at least about twice as many control moments when compared the rotary wing mode of operation. In one non-limiting embodiment, the maximum rotary wing airspeed ranges from about sixty to about eighty knots, however the specific value of the maximum rotary wing airspeed depends upon the specific design of the compound aircraft 10.

When operating in the transition mode of operation, the compound aircraft 10 employs both the rotary wing flight control surfaces 14 and the fixed wing flight control surfaces 16 to maneuver and stabilize the compound aircraft 10. The transition mode of operation is employed at mid-range airspeeds. Specifically, the control module 70 selects the transition mode of operation in response to determining the airspeed is greater than the minimum fixed wing airspeed, but less than the maximum rotary wing airspeed. The control module 70 apportions control between the plurality of rotary wing actuators 52 and the plurality of fixed wing actuators 54 based on the airspeed of the compound aircraft 10, where the specific amount of apportionment between the plurality of rotary wing actuators 52 and the plurality of fixed wing actuators 54 is determined based factors that include, but are not limited to, relative control sensitivities and control moments for each of the rotary wing flight control surfaces 14 and the fixed wing flight control surfaces 16.

Referring specifically to FIGS. 1A, 1B, and 2, when operating in the transition mode of operation, the plurality of fixed wing flight control surfaces 16 are controlled by the plurality of fixed wing actuation commands 112. In other words, the fixed wing flight control surfaces 16, which include the propulsor 38, the flaperons 40, and the elevators 44, are controlled by the inceptor force 82. However, the rotary wing flight control surfaces 14 (e.g., the main rotor 20 and the tail rotor 24) are controlled based on both the inceptor position 84 and the plurality of mechanical inputs 114.

It is to be appreciated that the present disclosure provides the same response strategy irrespective of the control mode (i.e., rotary wing mode versus fixed wing mode). For example, one type of response strategy that has relatively high augmentation is referred to as an acceleration command velocity hold (ACVH) response strategy. Referring generally to FIGS. 1A, 1B, 1C, and 2, in one embodiment the compound aircraft 10 controls the propeller thrust based on the ACVH response strategy. The compound aircraft 10 also includes a flight control strategy that employs the longitudinal/lateral control stick 48 to command a longitudinal acceleration of the compound aircraft 10 and the thrust/collective lever 47 to control a vertical acceleration of the compound aircraft 10, where the flight control strategy is implemented in both the rotary wing mode and the fixed wing mode. When the compound aircraft 10 operates in the rotary wing mode of operation, the plurality of operator control inputs 32 (FIG. 1C) move substantially in the same direction as the rotary wing flight control surfaces 14. However, when the compound aircraft 10 operates in the fixed wing mode of operation, the plurality of operator control inputs 32 (FIG. 1C) move substantially in an opposing direction when compared to the fixed wing flight control surfaces 16. Unlike a conventional fixed wing aircraft, when the compound aircraft 10 operates in the fixed wing mode of operation, a blade pitch of the propulsor 38 and the elevators 44 of the compound aircraft 10 are automatically controlled to achieve the longitudinal acceleration commanded by the longitudinal/lateral control stick 48.

In another example, a response strategy having less augmentation when compared to the ACVH response strategy is referred to as a rate command attitude hold (RCAH) response strategy. However, when the RCAH response strategy is employed, no longitudinal effector is included to command a longitudinal acceleration or speed the compound aircraft 10. Accordingly, a separate control effector such as, for example, cruise control buttons, acceleration pedals, or a thumbwheel is required. A thumbwheel controls the propeller thrust separately instead of having the propeller pitch controlled automatically along with the RCAH response strategy.

Referring to FIGS. 2 and 3, the two breakout points F1, F2 of the fixed wing force feel profile 124 require at least about two times as much force to move the operator control inputs 32 (FIG. 1C) in a position outside of the detent width 108 when compared to the two breakout points R1 and R2 that are associated with the rotary wing force feel profile 122. Accordingly, when the control module 70 switches between the rotary wing mode of operation and the fixed wing mode of operation, the change in force feel of the plurality of active parallel actuators 60 provides a tactile cue to the operator through the plurality of operator control inputs 32 indicating that the mode of operation has changed. In other words, the difference in gradient between the fixed wing detent force gradient and the rotary wing detent force gradient is of a magnitude so as to create a tactile cue through the plurality of operator control inputs 32 when the control module 70 switches between the rotary wing mode of operation and the fixed wing mode of operation.

Continuing to refer to FIGS. 2 and 3, it is usually challenging for an operator to exert a force upon the plurality of operator control inputs 32 (FIG. 1C) that is sufficient to exceed either the positive fixed wing breakout force $F_{+bo(fixed)}$ or the negative fixed wing breakout force $F_{-bo(fixed)}$. As a result, the plurality of active parallel actuators 60 are rarely, if ever, moved past the positive breakout position $\delta_{+bo}$ or the positive fixed wing breakout force $F_{+bo(fixed)}$ when the compound aircraft 10 operates in the fixed wing mode of operation. Therefore, as the compound aircraft 10 operates in the fixed wing mode of operation, the rotary wing flight control surfaces 14 remain in their respective minimum drag positions, which in turn may increase efficiency, performance and/or reduce load limit concerns for the compound aircraft 10.

Referring to FIGS. 1A, 1B, 1C, 2, and 3, adjustment of the zero-force detent position 100 (shown in FIG. 3) is now described. Specifically, when the compound aircraft 10 operates in either the rotary wing mode of operation or the transition mode of operation, then the control module 70 adjusts the zero-force detent position 100 based on the control law calculated aircraft trim positions of the rotary wing flight control surfaces 14. However, when the compound aircraft 10 operates in the fixed wing mode of operation, then the zero-force detent position 100 is dynamically adjusted based on the plurality of respective minimum drag positions of the rotary wing flight control surfaces 14. It is to be appreciated that the drag and load generated by the rotary wing flight control surfaces 14 is based on various operating conditions of the compound aircraft 10 such as, for example, airspeed, altitude, and temperature. Accordingly, the zero-force detent position 100 requires dynamic adjustment since the operating conditions of the compound aircraft 10 change almost continuously during flight.

Figure 4:
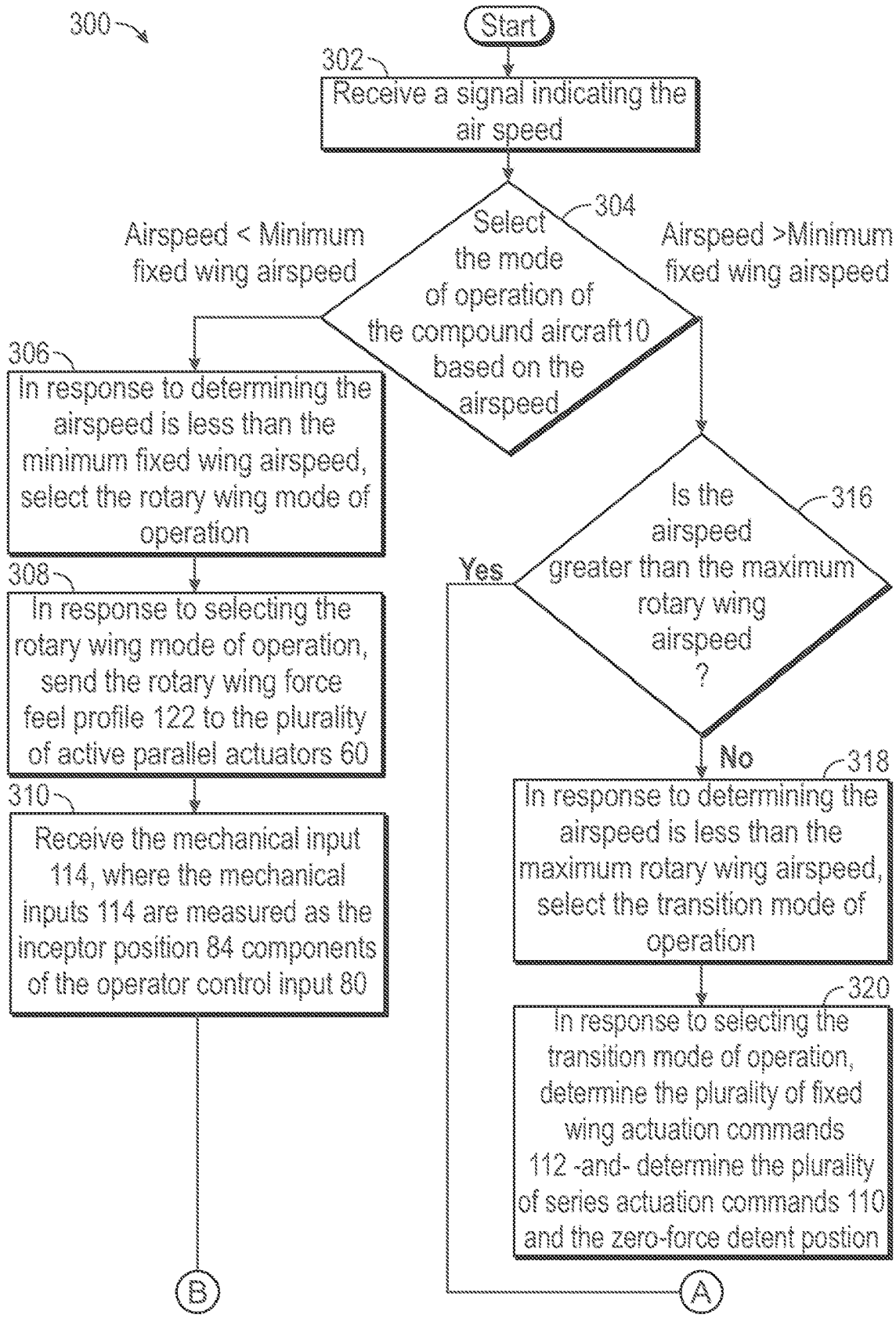
FIGS. 4 and 5 illustrate a process flow diagram of a method for operating the compound aircraft in either a fixed wing, rotary wing, or a transition mode of operation, according to an exemplary embodiment.
Figure 5:
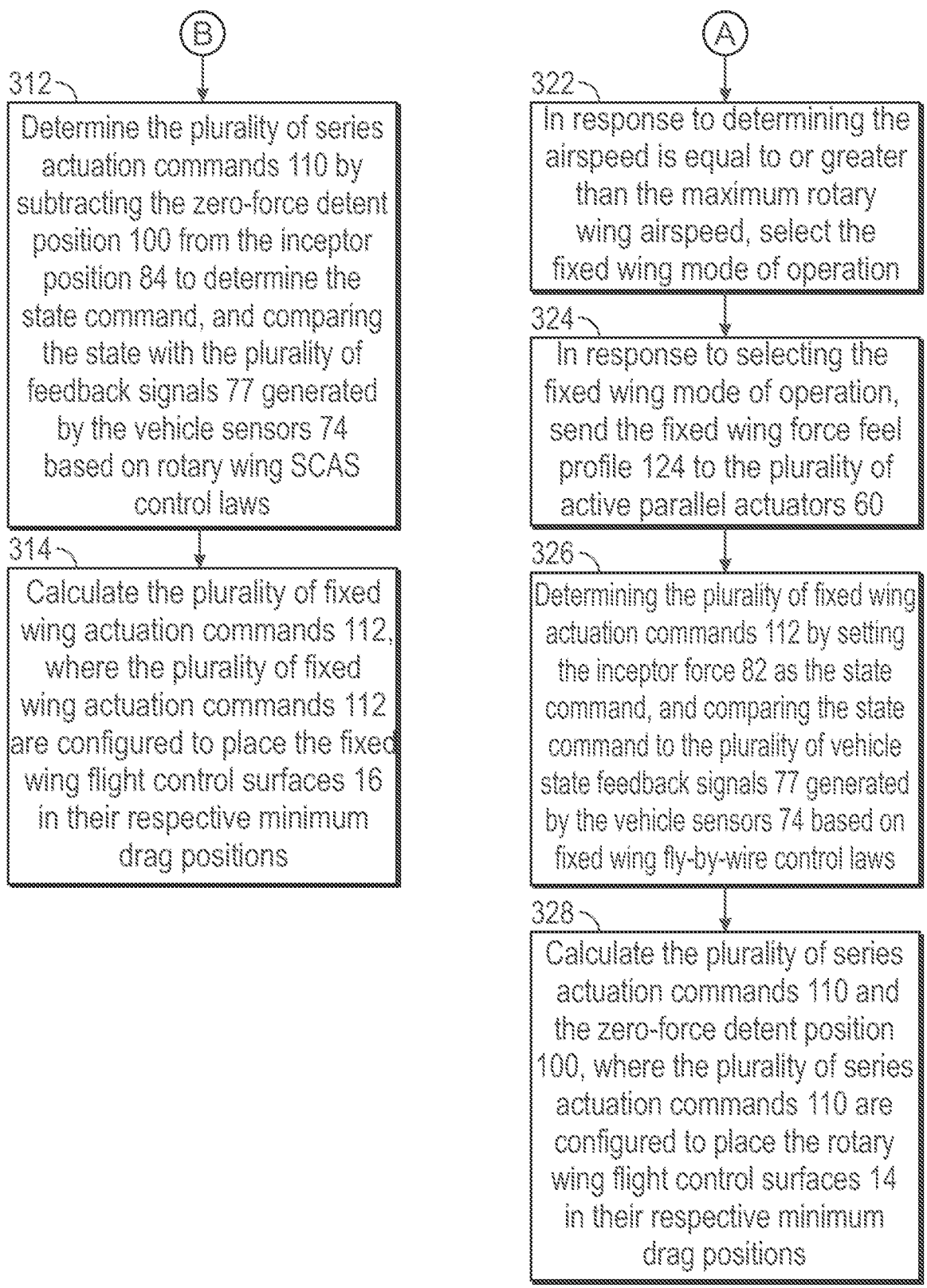

FIGS. 4 and 5 are an exemplary process flow diagram illustrating a method 300 of operating the compound aircraft 10 in either the fixed wing mode of operation, the rotary wing mode of operation, or the transition mode of operation. Referring generally to FIGS. 1A, 1B, 1C, 2, 3, and 4, the method 300 begins at block 302. In block 302, the control module 70 receives a signal indicating the airspeed of the compound aircraft 10. The method 300 may then proceed to block 304.

In block 304, the control module 70 selects the mode of operation based on the airspeed. Specifically, if the airspeed of the compound aircraft is less than the minimum fixed wing airspeed, then the method 300 may proceed to block 306. In block 306, in response to determining the airspeed of the compound aircraft 10 is less than the minimum fixed wing airspeed, the control module 70 selects the rotary wing mode of operation. The method then proceeds to block 308.

In block 308, in response to selecting the rotary wing mode of operation, the control module 70 sends the rotary wing force feel profile 122 (FIG. 3) to the plurality of active parallel actuators 60. As mentioned above, the rotary wing force feel profile 122 defines the rotary wing detent force gradient 132. The rotary wing detent force gradient 132 defines the breakout force required to move the plurality of active parallel actuators 60 out of the zero-force detent position 100. The method 300 may then proceed to block 310.

In block 310, the plurality of rotary wing actuators 52 receive the plurality of mechanical inputs 114, where the plurality of mechanical inputs 114 are measured as the inceptor position 84 components of the operator control input 80. The method 300 may then proceed to block 312.

In block 312, the control module 70 determines the plurality of series actuation commands 110 by subtracting the zero-force detent position 100 from the inceptor position 84 to determine the state command. The plurality of series actuation commands 110 are then determined by comparing the state command with the plurality of feedback signals 77 generated by the vehicle sensors 74 based on rotary wing SCAS control laws. The method may then proceed to block 314.

In block 314, the control module 70 calculates the plurality of fixed wing actuation commands 112, where the plurality of fixed wing actuation commands 112 are configured to place the fixed wing flight control surfaces 16 in their respective minimum drag positions. The method 300 may then return back to block 304.

As mentioned above, in block 304 the control module 70 determines the mode of operation based on the airspeed of the compound aircraft 10. Specifically, if the airspeed of the compound aircraft is equal to or greater than the minimum fixed wing airspeed, then the method 300 may proceed to block 316.

In block 316, the control module 70 determines if the airspeed of the compound aircraft is equal to or greater than the maximum rotary wing airspeed. In response to determining the airspeed of the compound aircraft 10 is not equal to or greater than the maximum rotary wing airspeed (i.e., the "NO" in FIG. 4), then the method 300 proceeds to block 318.

In block 318, in response to determining the airspeed is less than the maximum rotary wing airspeed, the control module 70 selects the transition mode of operation. The method then proceeds to block 320.

In block 320, in response to selecting the transition mode of operation, the control module 70, the control module 70 determines the plurality of fixed wing actuation commands 112 configured to control the plurality of fixed wing flight control surfaces 16. The control module 70 also determines the plurality of series actuation commands 110, where the plurality of series actuation commands 110 are configured to augment the plurality of mechanical inputs 114 generated by an operator. In other words, neither the rotary wing flight control surfaces 14 nor the fixed wing flight control surfaces 16 are commanded to their respective minimum drag positions.

Referring back to block 316, in response to determining the airspeed is equal to or greater than the maximum rotary wing airspeed, the method 300 proceeds to block 322.

In block 322, in response to determining the airspeed is equal to or greater than the maximum rotary wing airspeed, the control module 70 selects the fixed wing mode of operation. The method then proceeds to block 324.

In block 324, in response to selecting the fixed wing mode of operation, the control module 70 sends the fixed wing force feel profile 124 (FIG. 3) to the plurality of active parallel actuators 60. As mentioned above, the fixed wing force feel profile 124 defines the fixed wing detent force gradient 134. The method 300 may then proceed to block 326.

In block 326, the control module 70 determines the plurality of fixed wing actuation commands 112 by setting the inceptor force 82 as the state command. The fixed wing actuation commands 112 are then determined by comparing the state command to the plurality of vehicle state feedback signals 77 generated by the vehicle sensors 74 based on fixed wing fly-by-wire control laws. The method may then proceed to block 328.

In block 328, the control module 70 calculates the zero-force detent position 100 and the plurality of series actuation commands 110, where the plurality of series actuation commands 110 are configured to place the rotary wing flight control surfaces 14 in respective minimum drag positions.

Referring generally to the figures, the disclosed flight control system provides various technical effects and benefits. Specifically, the disclosed flight control system includes dual mode operator control inputs that may be used in the rotary wing mode, the fixed mode, and the transition mode of operation of the compound aircraft. In contrast, conventional flight control systems for a compound aircraft have employed either a fly-by-wire system exclusively or a relatively complicated, unconventional mechanical system. The disclosed flight control system employs active parallel actuators to move or effect the operator control input. It is to be appreciated that active parallel actuation technology allows for the underlying rotary wing control system to be implemented mechanically, while also allowing the fixed wing control system to employ the fly-by-wire system.

Figure 6:
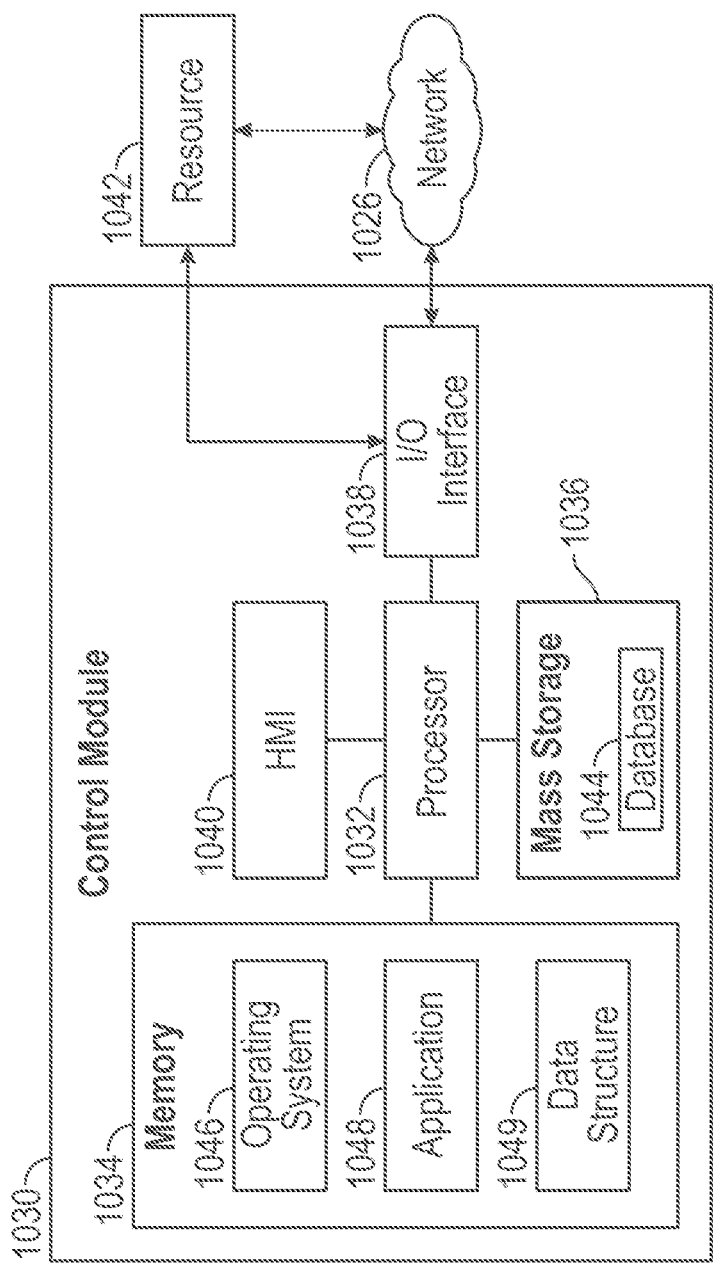
FIG. 6 is an illustration of a computer system used by the flight control system according to an exemplary embodiment.

Referring now to FIG. 6, the control module 70 is implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A flight control system for a compound aircraft, wherein the flight control system has a plurality of operator control inputs, the flight control system comprising:
   a plurality of active parallel actuators, wherein each active parallel actuator corresponds to one of the plurality of operator control inputs;
   one or more processors in electronic communication with the plurality of active parallel actuators; and
   a memory coupled to the one or more processors, the memory storing data comprising a database and program code that, when executed by the one or more processors, causes the flight control system to:
   receive a signal indicating an airspeed of the compound aircraft;
   select a mode of operation based on the airspeed, wherein the mode of operation is selected from a rotary wing mode of operation and a fixed wing mode of operation;
   in response to selecting the rotary wing mode of operation, send a rotary wing force feel profile to the plurality of active parallel actuators, wherein the rotary wing force feel profile defines a rotary wing detent force gradient; and
   in response to selecting the fixed wing mode of operation, send a fixed wing force feel profile to the plurality of active parallel actuators, wherein the fixed wing force feel profile defines a fixed wing detent force gradient, and the fixed wing detent force gradient is at least about two times greater than the rotary wing detent force gradient.

2. The flight control system of claim 1, wherein the one or more processors execute instructions to:
   determine the airspeed of the compound aircraft is less than a minimum fixed wing airspeed; and
   in response to determining the airspeed of the compound aircraft is less than the minimum fixed wing airspeed, select the rotary wing mode of operation.

3. The flight control system of claim 2, wherein the one or more processors execute instructions to:
   subtract a zero-force detent position from an inceptor position to determine a state command; and
   determine a plurality of series actuation commands by comparing the state command with a plurality of feedback signals generated by vehicle sensors based on rotary wing stability and command augmentation system (SCAS) control laws.

4. The flight control system of claim 3, wherein a plurality of mechanical inputs are created as an operator manipulates the plurality of operator control inputs, and wherein the plurality of series actuation commands are configured to augment the plurality of mechanical inputs.

5. The flight control system of claim 2, further comprising a plurality of fixed wing flight control surfaces in electronic communication with the one or more processors, wherein the one or more processors execute instructions to:
   calculate a plurality of fixed wing actuation commands, wherein the plurality of fixed wing actuation commands are configured to place the fixed wing flight control surfaces in their respective minimum drag positions.

6. The flight control system of claim 1, wherein the one or more processors execute instructions to:
   determine the airspeed of the compound aircraft is equal to or greater than a minimum fixed wing airspeed and less than a maximum rotary wing airspeed; and
   in response to determining the airspeed of the compound aircraft is equal to or greater than a minimum fixed wing airspeed and less than a maximum rotary wing airspeed, select a transition mode of operation.

7. The flight control system of claim 6, further comprising a plurality of fixed wing flight control surfaces in electronic communication with the one or more processors, wherein the one or more processors execute instructions to:
   in response to selecting the transition mode of operation, determine a plurality of fixed wing actuation commands, wherein the plurality of fixed wing actuation commands are configured to control the plurality of fixed wing flight control surfaces.

8. The flight control system of claim 6, wherein the one or more processors execute instructions to:
   in response to selecting the transition mode of operation, determine a plurality of series actuation commands, wherein the plurality of series actuation commands are configured to augment a plurality of mechanical inputs generated by an operator.

9. The flight control system of claim 1, wherein the one or more processors execute instructions to:
   determine the airspeed of the compound aircraft is equal to or greater a maximum rotary wing airspeed; and
   in response to determining the airspeed of the compound aircraft is equal to or greater than the maximum rotary wing airspeed, select the fixed wing mode of operation.

10. The flight control system of claim 9, wherein the one or more processors execute instructions to:

set an inceptor force as a state command, wherein the inceptor force represents a quantity of force that is exerted upon the plurality of active parallel actuators; and determine a plurality of fixed wing actuation commands by comparing the state command to a plurality of vehicle state feedback signals generated by vehicle sensors based on fixed wing fly-by-wire control laws.

11. The flight control system of claim 9, further comprising a plurality of rotary wing flight control surfaces in electronic communication with the one or more processors, wherein the one or more processors execute instructions to:

calculate a zero-force detent position and a plurality of series actuation commands, wherein the plurality of series actuation commands are configured to place the rotary wing flight control surfaces in respective minimum drag positions.

12. The flight control system of claim 1, wherein both the rotary wing force feel profile and the fixed wing force feel profile are represented by respective piecewise linear functions that are continuous.

13. A method of operating a compound aircraft in either a fixed wing mode of operation, a rotary wing mode of operation, or a transition mode of operation, the method comprising:

receiving, by a computer, a signal indicating an airspeed of the compound aircraft;

selecting, by the computer, a mode of operation based on the airspeed, wherein the mode of operation is selected from the rotary wing mode of operation and the fixed wing mode of operation;

in response to selecting the rotary wing mode of operation, sending a rotary wing force feel profile to a plurality of active parallel actuators, wherein the rotary wing force feel profile defines a rotary wing detent force gradient; and in response to selecting the fixed wing mode of operation, sending a fixed wing force feel profile to the plurality of active parallel actuators, wherein the fixed wing force feel profile defines a fixed wing detent force gradient, and the fixed wing detent force gradient is at least about two times greater than the rotary wing detent force gradient.

14. The method of claim 13, further comprising:
determining the airspeed of the compound aircraft is less than a minimum fixed wing airspeed; and in response to determining the airspeed of the compound aircraft is less than the minimum fixed wing airspeed, selecting the rotary wing mode of operation.

15. The method of claim 14, further comprising:
subtracting a zero-force detent position from an inceptor position to determine a state command; and determining a plurality of series actuation commands by comparing the state command with a plurality of feedback signals generated by vehicle sensors based on SCAS control laws.

16. The method of claim 14, further comprising:
calculating a plurality of fixed wing actuation commands, wherein the plurality of fixed wing actuation commands are configured to place a plurality of fixed wing flight control surfaces in their respective minimum drag positions.

17. The method of claim 13, further comprising:
determining the airspeed of the compound aircraft is equal to or greater than a minimum fixed wing airspeed and less than a maximum rotary wing airspeed; and in response to determining the airspeed of the compound aircraft is equal to or greater than a minimum fixed wing airspeed and less than a maximum rotary wing airspeed, selecting a transition mode of operation.

18. The method of claim 17, further comprising:
in response to selecting the transition mode of operation, determining a plurality of fixed wing actuation commands configured to control a plurality of fixed wing flight control surfaces; and determining a plurality of series actuation commands configured to augment a plurality of mechanical inputs generated by an operator.

19. The method of claim 13, further comprising:
determining the airspeed of the compound aircraft is equal to or greater a maximum rotary wing airspeed; and in response to determining the airspeed of the compound aircraft is equal to or greater than the maximum rotary wing airspeed, selecting the fixed wing mode of operation.

20. The method of claim 19, further comprising:
setting an inceptor force as a state command, wherein the inceptor force represents a quantity of force exerted upon the plurality of active parallel actuators; and determining a plurality of fixed wing actuation commands by comparing the state command to a plurality of vehicle state feedback signals generated by vehicle sensors based on fixed wing fly-by-wire control laws.

\* \* \* \* \*